US009931778B2

(12) United States Patent
Bogucki et al.

(10) Patent No.: US 9,931,778 B2
(45) Date of Patent: *Apr. 3, 2018

(54) EXTRUDED DEPOSITION OF FIBER REINFORCED POLYMERS

(71) Applicant: The Boeing Company, Chicago, IL (US)

(72) Inventors: Gregg Robert Bogucki, St. Charles, MO (US); Gregory James Schoepen Hickman, University City, MO (US); Michael William Hayes, Belleville, IL (US)

(73) Assignee: THE BOEING COMPANY, Chicago, IL (US)

( * ) Notice: Subject to any disclaimer, the term of this patent is extended or adjusted under 35 U.S.C. 154(b) by 697 days.

This patent is subject to a terminal disclaimer.

(21) Appl. No.: 14/489,972

(22) Filed: Sep. 18, 2014

(65) Prior Publication Data

US 2016/0082641 A1 Mar. 24, 2016

(51) Int. Cl.
*B29C 67/00* (2017.01)
*B29C 47/02* (2006.01)
*B29C 47/00* (2006.01)
*B29C 47/06* (2006.01)
*B29C 47/08* (2006.01)
*B29C 47/10* (2006.01)
*B29C 47/86* (2006.01)
*B29C 70/24* (2006.01)
*B33Y 10/00* (2015.01)
*B33Y 30/00* (2015.01)
*B29L 31/30* (2006.01)
*B29B 15/12* (2006.01)

(52) U.S. Cl.
CPC ........ *B29C 47/025* (2013.01); *B29C 47/0004* (2013.01); *B29C 47/06* (2013.01); *B29C 47/0842* (2013.01); *B29C 47/10* (2013.01); *B29C 47/862* (2013.01); *B29C 67/0055* (2013.01); *B29C 70/24* (2013.01); *B33Y 10/00* (2014.12); *B33Y 30/00* (2014.12); *B29B 15/122* (2013.01); *B29L 2031/3076* (2013.01)

(58) Field of Classification Search
None
See application file for complete search history.

(56) References Cited

U.S. PATENT DOCUMENTS 5,121,329 A 6/1992 Crump
5,936,861 A 8/1999 Jang et al.
(Continued)

FOREIGN PATENT DOCUMENTS

EP 2616784 A1 12/2013

OTHER PUBLICATIONS

Wollan, "Pushtrusion Direct In-Line Long Fiber Thermoplastic (D-LFT) Compounding Technology Versus LFT Pellets and GMT Sheet," PlastiComp, Inc., copyright 2014, 6 pages.
(Continued)

*Primary Examiner* — Nathan T Leong
(74) *Attorney, Agent, or Firm* — Yee & Associates, P.C.

(57) ABSTRACT

A fiber reinforced polymer part is fabricated by rastering a deposition head over a substrate, and additively forming part features by extruding a polymer having an entrained continuous reinforcement from the deposition head onto a substrate.

17 Claims, 4 Drawing Sheets

(56) References Cited

U.S. PATENT DOCUMENTS

| | | | |
|---|---|---|---|
| 6,186,769 B1 | 2/2001 | Hawley | |
| 6,387,179 B1* | 5/2002 | Anderson | B29B 15/122 |
| | | | 118/125 |
| 6,431,847 B1 | 8/2002 | Hawley et al. | |
| 6,604,929 B2 | 8/2003 | Hawley et al. | |
| 6,676,864 B2 | 1/2004 | Hawley | |
| 6,875,385 B2 | 4/2005 | Hawley et al. | |
| 6,934,600 B2 | 8/2005 | Jang et al. | |
| 7,169,340 B2 | 1/2007 | Hawley | |
| 7,897,248 B2 | 3/2011 | Barrera et al. | |
| 7,993,122 B2 | 8/2011 | Bowen | |
| 7,993,620 B2 | 8/2011 | Lashmore et al. | |
| 8,231,303 B1 | 7/2012 | Bowen et al. | |
| 8,807,125 B1 | 8/2014 | Mathur et al. | |
| 2003/0236588 A1* | 12/2003 | Jang | B82Y 30/00 |
| | | | 700/119 |
| 2005/0280184 A1 | 12/2005 | Sayers et al. | |
| 2007/0116631 A1 | 5/2007 | Li et al. | |
| 2007/0237959 A1 | 10/2007 | Lemaire | |
| 2008/0170982 A1 | 7/2008 | Zhang et al. | |
| 2009/0065965 A1* | 3/2009 | Bowen | B29B 7/42 |
| | | | 264/148 |
| 2009/0258217 A1 | 10/2009 | Hoefflin et al. | |
| 2010/0126134 A1 | 5/2010 | Atkinson et al. | |
| 2011/0024694 A1* | 2/2011 | Shah | C08J 5/042 |
| | | | 252/502 |
| 2012/0085970 A1 | 4/2012 | Zhang et al. | |
| 2014/0134335 A1 | 5/2014 | Pridoehl et al. | |
| 2014/0232035 A1 | 8/2014 | Bheda | |
| 2014/0329085 A1 | 11/2014 | Kim et al. | |
| 2016/0082659 A1 | 3/2016 | Hickman et al. | |

OTHER PUBLICATIONS

European Patent Office Communication dated Mar. 8, 2017, regarding Application No. 15180372.3, 5 pages.
Hickman et al., "Extruded Deposition of Polymers Having Continuous Carbon Nanotube Reinforcements," U.S. Appl. No. 14/602,964, filed Jan. 22, 2015, 35 pages.
Extended European Search Report, dated Mar. 29, 2016, regarding Application No. EP15180372.3, 9 pages.
Namiki et al. "3D Printing of Continuous Fiber Reinforced Plastic," Proceedings of the Society of the Advancement of Material and Process Engineering, Jun. 2014, 6 pages.
Office Action, dated Jul. 27, 2017, regarding U.S. Appl. No. 14/602,964, 25 pages.

\* cited by examiner

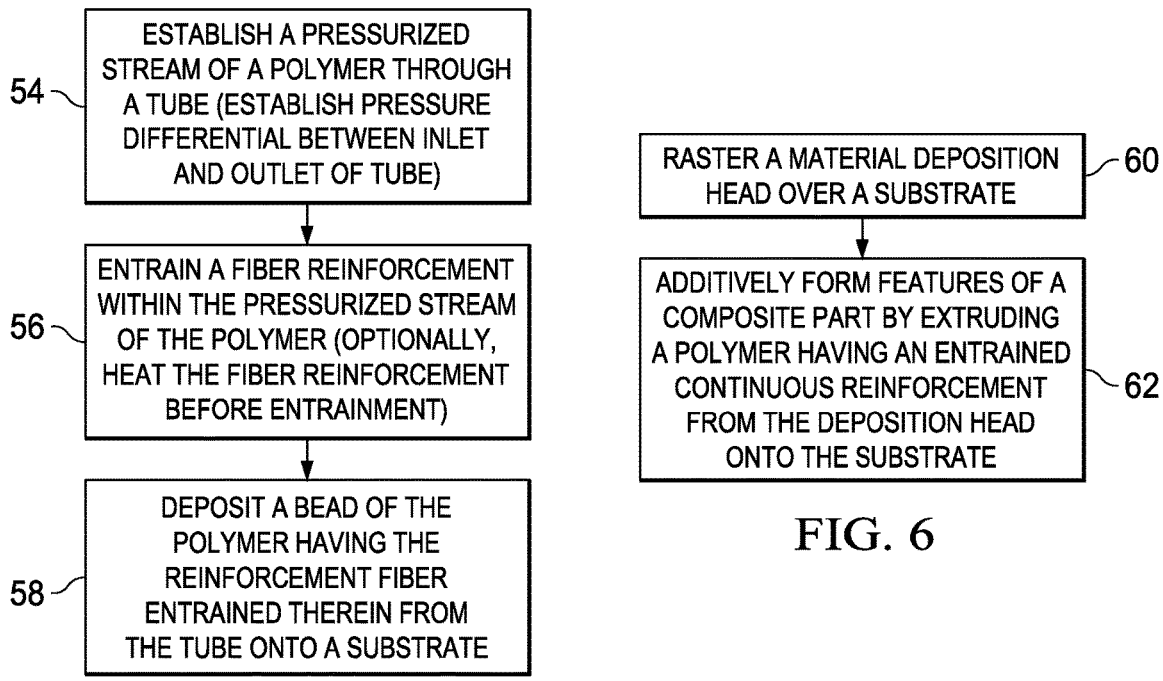
FIG. 5
FIG. 6
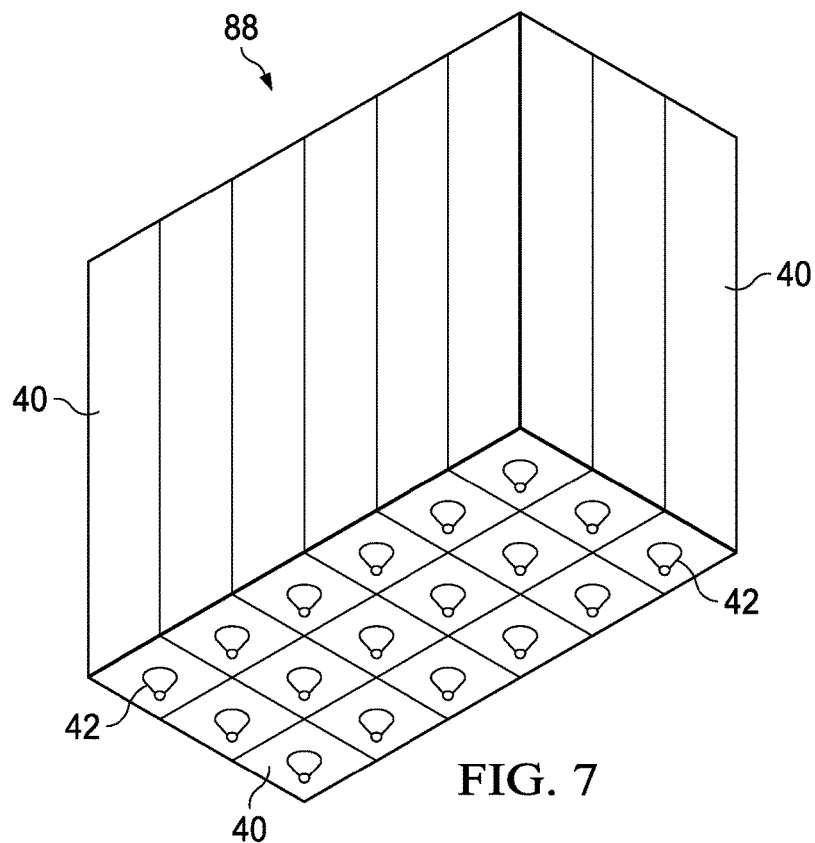
FIG. 7

EXTRUDED DEPOSITION OF FIBER REINFORCED POLYMERS

BACKGROUND INFORMATION

1. Field

The present disclosure generally relates to additive manufacturing techniques, and deals more particularly with a method and apparatus for deposition of fiber reinforced polymers, such as thermoplastic polymers.

2. Background

Additive manufacturing is a process in which physical parts are produced directly from a 3-D (three dimensional) CAD (computer aided design) file. In one type of additive manufacturing known as fused deposition modeling (FDM®) and sometimes referred to as 3-D printing, a part is produced by extruding small beads of thermoplastic polymer material to form layers of the material that solidifies after being extruded from a nozzle. The extrusion nozzle may be moved along a toolpath or "rastered" by a numerically controlled mechanism to build the part from the bottom up on a build platform, one layer at a time.

Parts produced by known additive manufacturing processes, such as FDM®, may not be suitable for use in some applications requiring high structural performance, such as in the aerospace industry. In order to achieve higher structural performance, thermoplastic parts used in these applications typically require the use of an embedded reinforcement such as discontinuous or continuous fibers. However, the integration of a continuous fiber reinforcement into an extruded thermoplastic polymer during fused deposition modeling has not been heretofore practical.

It is known to introduce discontinuous (e.g. "chopped") reinforcing fibers into an extruded polymer. For example, a process known as PUSHTRUSION® has been developed for molding reinforced polymer composites using a direct, in-line compounding and molding process, in which the mold charge comprises extruded polymer pellets or strands reinforced with discontinuous fibers. However, the PUSHTRUSION® process utilizes large and heavy industrial equipment meant to provide discontinuous fiber reinforced polymer strands or pellets for molding, and is not suitable for use in additive manufacturing processes such as FDM.

Accordingly, there is a need for an additive manufacturing process such as FDM that allows integration of a reinforcement into a bead of polymer deposited in layers to form features of a part. There is also a need for an end effector to carry out the process described above which allows entrainment of a continuous reinforcement into a liquified polymer as the end effector builds features of the part.

SUMMARY

The disclosed embodiments provide a method and apparatus for fabricating reinforced polymer parts using an additive manufacturing technique. The reinforcement may be continuous and is integrated into a molten bead of the polymer as the polymer is being deposited in layers to form features of the part, similar to fused deposition modeling. The embodiments permit fabrication of parts having higher structural performance requirements. High resolution deposition of continuously reinforced polymers is made possible.

According to one disclosed embodiment, a deposition fabrication method is provided. The method comprises establishing a pressurized stream of a molten polymer through a tube, entraining a fiber reinforcement within the pressurized stream, and depositing a bead of the polymer and the fiber reinforcement from the tube onto a substrate. The fiber reinforcement is entrained by feeding it into the tube. The fiber reinforcement may comprise a filament, a tow, a roving or a yarn. The fiber reinforcement may be entrained by feeding one of a dry fiber reinforcement and a pre-impregnated fiber reinforcement the tube. The fiber reinforcement may be heated. In one variation, a plurality of discontinuous fiber reinforcements may be coupled together into a chain, and the chain may be entrained by drawing it into the pressurized stream. The method may also include encapsulating the fiber reinforcement in a polymer having a melt temperature that is higher than the melt temperature of the polymer in the pressurized stream. A desired polymer viscosity may be maintained by applying a varying amount of heat to the tube along its length. Optionally, the method may further include depositing a bead of polymer onto the substrate wherein the polymer is devoid of the fiber reinforcement. The pressurized stream is established by injecting the polymer under pressure into the tube. Injecting the polymer under pressure into the tube includes establishing a pressure differential between an upstream end and a downstream end of the tube. The method may also include drawing the fiber reinforcement through the tube along with the polymer using the pressurized stream and/or by capillary action. The fiber reinforcement may be entrained by introducing it into an upstream end of the tube. The polymer is introduced into the tube annularly around the fiber reinforcement According to another embodiment, a method is provided of fabricating a composite part. A deposition head is rastered over a substrate. Features of the part are additively formed by extruding a polymer having a reinforcement from the deposition head onto a substrate. The method may include entraining a discontinuous reinforcement in the polymer, or alternatively, entraining a continuous reinforcement in the polymer. In one variation, features may be extruded that are devoid of the reinforcement. The extrusion includes introducing the polymer and the reinforcement into an upstream end of a tube, forcing the polymer to flow through the tube to a downstream end of the tube, and drawing the reinforcement through the tube to the downstream end of the tube by using the flow of polymer through the tube to drag the reinforcement along with the polymer flow. The method may also include using capillary action to assist in drawing the reinforcement through the tube. The polymer is introduced by injecting the polymer under pressure around the reinforcement. The extrusion includes forcing the polymer and the entrained reinforcement through a die. The method may also include cutting the polymer and the reinforcement during rastering of the deposition head.

According to still another embodiment, an end effector is provided for performing deposition of a fiber reinforced polymer. The end effector includes a supply of a continuous fiber reinforcement, and a supply of a flowable polymer. A deposition head is provided having a polymer inlet and a material supply end configured to receive a supply of a continuous fiber reinforcement. The deposition had also includes a deposition end configured to deposit a bead of the polymer having the continuous fiber reinforcement entrained therein. The end effector may further comprise a heater for heating the entrainment barrel, including at least one heating coil having a plurality of coil turns that vary in number along a length of the entrainment barrel. The deposition head includes an entrainment barrel configured to entrain the continuous fiber reinforcement. The entrainment barrel includes a convergence region in which the continuous fiber reinforcement and the flowable polymer converge.

The entrainment barrel my also include an extrusion die coupled with the deposition end. The entrainment barrel may further include a capillary tube coupled with the convergence region and configured entrain the continuous fiber reinforcement in the polymer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is an illustration of a flow diagram of one embodiment of a deposition method;

FIG. 6 is an illustration of a flow diagram of a method of fabricating a composite part;

FIG. 7 is an illustration of a bottom, perspective view of a deposition head array for deposition of a fiber reinforced polymer;

DETAILED DESCRIPTION

Figure 1:
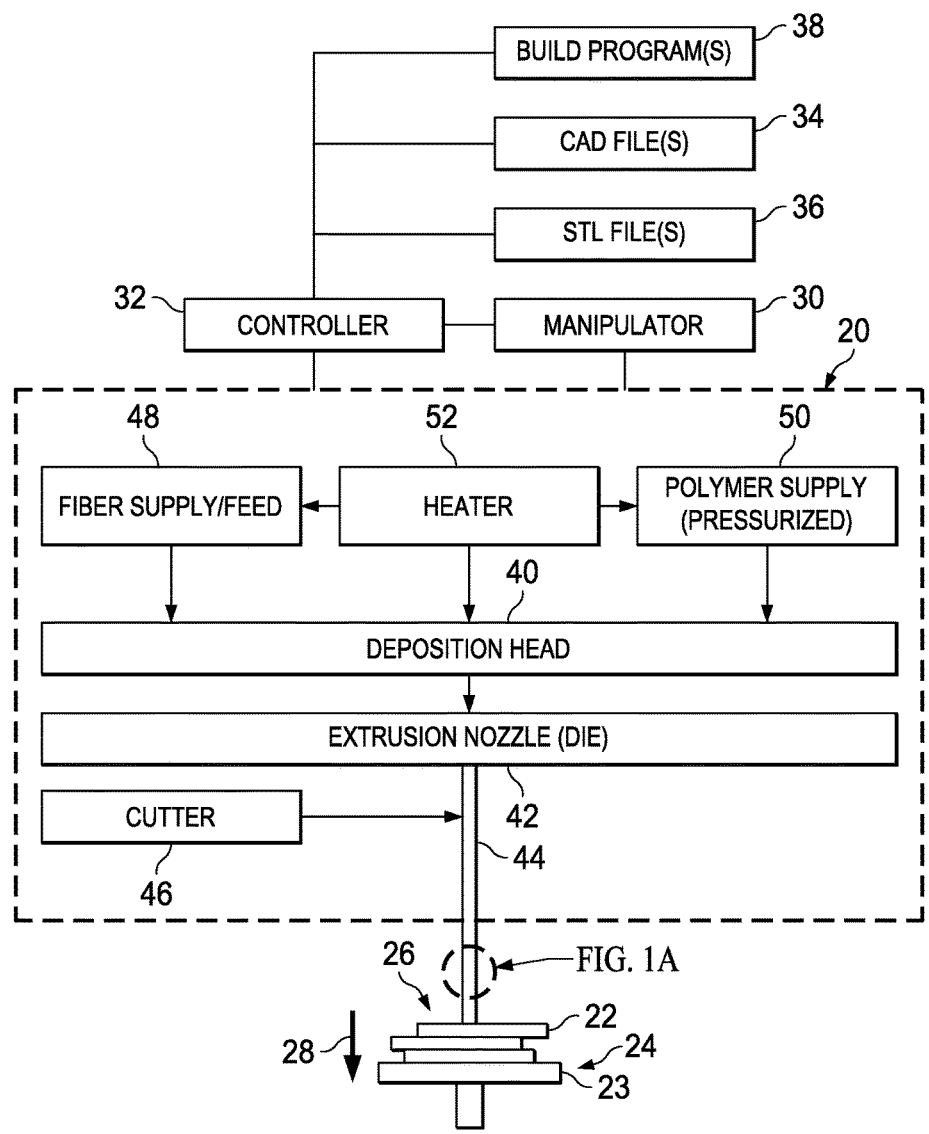
FIG. 1 is an illustration of an overall block and diagrammatic of apparatus for fabricating a fiber reinforced part using an additive manufacturing technique.

Referring to FIG. 1, the disclosed embodiments comprise an end effector 20 that may be a rastered through three dimensional space over a substrate 23 such as a platform 24 by any suitable manipulator 30. The manipulator 30 may comprise, for example and without limitation, a numerically controlled gantry mechanism (not shown), and an articulated robotic arm (not shown) or a similar mechanism. Both the end effector 20 and the manipulator 30 are operated by the combination of a controller 32 and build programs 38 or similar software. The controller 32 may comprise, without limitation, a programmed special-purpose or general purpose computer, such as a PC (personal computer) or a PLC (programmable logic controller).

Figure 1A:
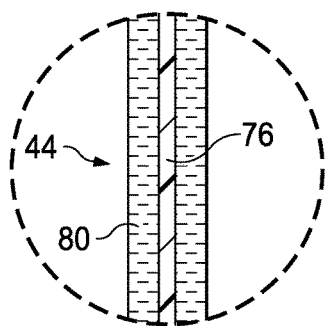
FIG. 1A is an illustration of the area designated as "FIG. 1A" in FIG. 1, parts of an extruded bead being broken away to reveal a fiber reinforcement entrained in polymer.

The end effector 20 builds a three dimensional, fiber reinforced, polymer part 26, layer 22 by layer 22 on the platform 24 which moves down 28 as each reinforced polymer layer 22 is completed. The polymer part 26, sometimes referred to herein as a composite part 26, is defined by one or more CAD (computer aided design) files 34 which are converted to STL (stereolithography) format files 36 defining the surfaces of the part 26. Using the STL files 36, and one or more build programs 38, the controller 32 controls the operation of the end effector 20 and the manipulator 30. The manipulator 30 rasters the end effector 20 over the platform 24 to deposit molten beads 44 of soft, fiber reinforced polymer that subsequently solidify. As shown in FIG. 1A, each of the molten beads 44 comprises an extruded polymer 80 having a continuous fiber reinforcement 76 entrained therein. As the reinforced polymer solidifies, the layers 22 fuse together to form the various features of the fiber reinforced composite part 26.

The end effector 20 includes a deposition head 40 that may be provided with an extrusion nozzle or die through which a fiber reinforced molten bead 44 of reinforced polymer is deposited onto the platform 24, or onto an underlying layer 22. As mentioned above, the bead 44 includes a fiber reinforcement 76 (FIGS. 1, 2, 3 and 4) that is entrained in the extruded polymer 80 as the beads 44 are extruded to form the layers 22 which then solidify and fuse together. The extrusion nozzle 42 may have a nozzle opening 42a (FIG. 2) for extruding a polymer bead 44 having the entrained fiber reinforcement 76. The nozzle opening 42a may have desired cross-sectional shape such as, without limitation, a circular, square, elliptical, ribbon or rectangular cross-sectional shape.

The end effector 20 further comprises a fiber supply and feed 48, a pressurized polymer supply 50 and one or more suitable heaters 52. The polymer supply 50 may include one or more control valves and pressure regulators (not shown) as may be required for controlling the flow and pressure of polymer that is supplied to the deposition head 40. The heater 52 heats the polymer until it liquefies and becomes flowable, and also provides heat to the deposition head 40 to maintain the polymer desired viscosity until the polymer 80 and entrained fiber reinforcement 76 exit the extrusion nozzle 42. The desired polymer viscosity may depend on a variety of factors, including without limitation, the temperature to which the polymer is heated, the amount of heat absorption by the fiber reinforcement 76, the particular polymer 80 being used and its shear rate, the ability of the fiber reinforcement 76 to be wetted by the polymer 80, the desired rate of extrusion from the deposition head 40 and the rate at which the end effector 20 is rastered over the substrate 23. Generally, however, the polymer 80 should have a viscosity that is low enough to wet out the fiber reinforcement 76 and be extruded from the deposition head 40.

Optionally, the heater 52 may be used to heat the fiber reinforcement 76 before and/or as it is being fed into the deposition head 40 and becomes entrained in the polymer 80. The end effector 20 may also include a suitable cutter 46 which cuts the fiber reinforced polymer bead 44 after a layer 22 has been deposited. The cutter 46 may comprise, for example and without limitation, a laser cutter, an ultrasonic knife or a mechanical cutter such as a guillotine blade (all not shown) that cuts through both the polymer 80 and the entrained fiber reinforcement 76.

The polymer 80 supplied to the deposition head 40 may be any phase changeable polymer that reduces in viscosity when heated to at least its glass transition temperature, and then solidifies and hardens when cooled. For example, and without limitation, the polymer 80 drawn into the deposition head 40 from the polymer supply 50 may comprise any suitable amorphous or crystalline thermoplastic polymer, thermoset or a thermoplastic co-polymer.

The fiber reinforcement 76 that is entrained in the polymer 80 may comprise one or more fiber filaments, tows, rovings, or yarns that are compatible with the polymer 80, such as carbon, glass, ceramic or metal fibers, or combination of such fibers. The fiber reinforcement 76 may be in the form of, without limitation, one or more tows, rovings or yarns, each comprising a multiplicity of individual filaments. In some embodiments, for example, the reinforcement 76 may comprise a single tow, roving or yarn comprising a linear weight between 2 and 16 tex, wherein a "tex" is the mass in grams of 1,000 meters of a thread of the tow, roving or yarn. The fiber reinforcement 76 may be a dry fiber reinforcement or may be pre-impregnated fiber reinforcement.

The tow, roving or yarn may comprise dry filaments, however in some embodiments, the tow may be pre-impregnated with a polymer that is the same as or different from the polymer 80 drawn from the polymer supply 50. It may also be possible to form a reinforcement strand by encapsulating a tow, roving or yarn in a first polymer that has a relatively high melt temperature, and then feed the encapsulated tow through the deposition head 40 where it is entrained within a second polymer 80 that has a melt temperature that is lower than that of the first polymer. In other embodiments, the fiber reinforcement 76 may comprise discontinuous fiber reinforcements (e.g. chopped fibers) that may or may not be aligned and are coupled together, as by a binder, into a chain (not shown) that can be drawn or "pulled" through the deposition head 40 by a flowing stream of the polymer 80 in which the chain of discontinuous fiber reinforcements 76 is entrained.

Figure 2:
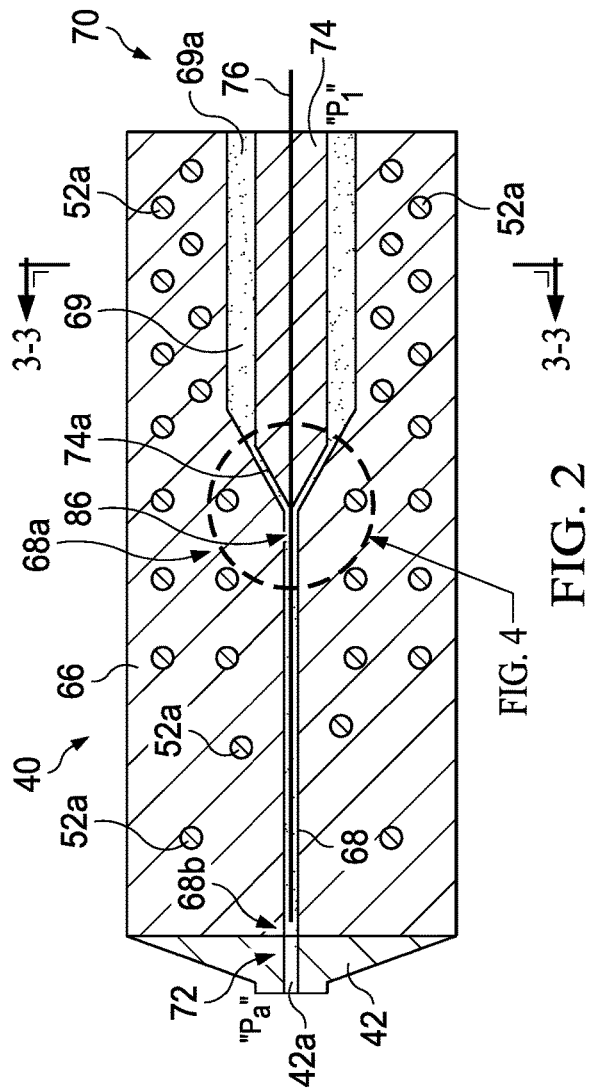
FIG. 2 is an illustration of a cross-sectional view of a deposition head which forms part of the apparatus shown in FIG. 1.
Figure 3:
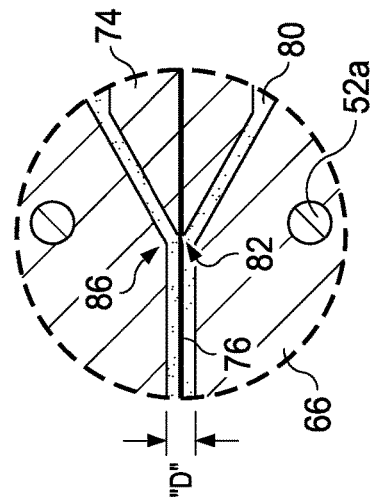
FIG. 3 is an illustration of a sectional view taken along the line 3-3 in FIG. 2.
Figure 4:
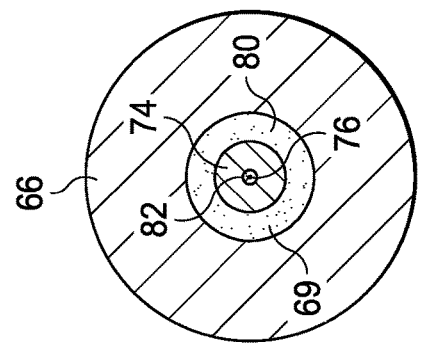
FIG. 4 is an illustration of an enlarged view of the section designated as "FIG. 4" in FIG. 2.

Attention is now directed to FIGS. 2, 3 and 4 which illustrate details of the deposition head 40 which comprises the forming part of the end effector 20. The deposition head 40 includes an elongate entrainment barrel 66 having a material supply end 70, and a material deposition end 72 from which a molten bead 44 (FIG. 1) of fiber reinforced polymer is extruded and deposited, as previously explained. The entrainment barrel 66 includes an internal capillary tube 68 having first upstream end 68a, and a second, downstream end 68b opposite the upstream end 68a. The capillary tube 68 extends longitudinally from the material deposition end 72 of the entrainment barrel 66 to a convergence region 86 where the fiber reinforcement 76 is introduced into and converges with a flowing stream of the polymer 80 that is introduced into the entrainment barrel 66 upstream of the convergence region 86.

When the fiber reinforcement 76 is introduced into the flowing stream of the polymer 80, viscous interaction between the fiber reinforcement 76 and the polymer 80 pulls the fiber reinforcement 76 into the upstream end 68a of, and then through the capillary tube 68. Upon entering the convergence region 86, the fiber reinforcement 76 becomes entrained in the flowing stream of polymer 80 and is carried along with the polymer 80 through the capillary tube 68 to the material deposition end 72 of the entrainment barrel 66 where the polymer 80 and the entrained fiber reinforcement 76 are extruded together as a bead 44.

The downstream end 68b of the capillary tube 68 may be coupled with an extrusion die 42 in order to extrude a polymer bead 44 having a desired cross-sectional shape. In some applications, the extrusion die may not be necessary. The capillary tube 68 has an inside diameter "D" that will depend on a variety of factors, including the particular deposition application, the print resolution of the part 26 (FIG. 1) being fabricated and the volume fraction of fiber reinforcement that is desired. The volume fraction of the fiber reinforcement 76 contained in the polymer is a function of both the inside diameter "D" of the capillary tube 68, and the number and diameter of the fibers that form the fiber reinforcement 76. The length of the capillary tube may also affect the amount of entrained polymer-to-fiber interaction that is needed to move the fiber reinforcement 76 though the capillary tube 68.

The material supply end 70 of the entrainment barrel 66 is provided with a centrally located guide tube into which the fiber reinforcement 76 may be longitudinally fed from the fiber supply and feed 48 (FIG. 1). The downstream end 74a of the guide tube 74 is tapered and includes a central opening 82 (FIGS. 3 and 4) that is coaxially aligned with the capillary tube 68. After being fed into the guide tube 74, the fiber reinforcement 76 is guided through the opening 82, in axial alignment with the capillary tube 68, and enters the convergence region 86 where is it converges with, is exposed to and becomes wetted by molten polymer that flows over the outside of guide tube 74 into the capillary tube 68. As the fiber reinforcement 76 enters the convergence region 86, it becomes entrained within the polymer 80 flowing through the convergence region 86 into the capillary tube 68.

The material supply end 70 of the entrainment barrel 66 further includes an annular polymer passageway surrounding the guide tube 74. In one embodiment, flowable molten polymer 80 may be introduced into the annular polymer passageway 69 through a polymer inlet 69a at the material supply end 70 (as illustrated), in a direction generally parallel to the direction in which the fiber reinforcement 76 is fed into the guide tube 74. Alternatively, in another embodiment (not shown), the flowable molten polymer 80 may be cross-fed through the side of the entrainment barrel 66 into the passageway 69 in a direction that is transverse to the direction in which the fiber reinforcement 76 is fed into the guide tube 74.

Polymer 80 is injected from the polymer supply into the polymer inlet 69a at a pressure "$P_1$", and flows into through the annular passageway 69. The annular passageway 69 tapers and converges with the tapered end 74a of the guide tube 74, causing the flowing polymer 80 to flow past and over the fiber reinforcement 76 into the upstream end 68a of the capillary tube 68. The pressure "$P_1$" is greater than atmospheric pressure "$P_a$" at the material deposition end 72 of the of the entrainment barrel 66, consequently a pressure differential of $P_1$-$P_a$ exists between the opposite ends 68a, 68b of the capillary tube 68. This pressure differential assists in drawing and entraining the fiber reinforcement 76 into the flowing polymer 80.

The heater 52 shown in FIG. 1 may include one or more electric heating coils 52a that either surround or are embedded in the entrainment barrel 66 as shown in FIG. 2. The electric heating coils 52a provide the necessary heat to maintain the polymer 80 in a flowable state with a desired viscosity. It may be desirable to maintain the temperature of the entrainment barrel 66 at the material supply end 70 at a temperature that is greater than the temperature at the material deposition end 72 in order to assure adequate wetting of the fiber reinforcement 76 as it is initially drawn into the capillary tube 68. In order to vary the amount of heat supplied to the polymer 80 as it travels along the length of the entrainment barrel 66 and thereby control the viscosity of the polymer 80, the heating coils 52a may have a greater number of coil turns at the material supply end 70 on the entrainment barrel 66 compared to the number of coil turns at the material deposition end 72.

In use, one or more fiber reinforcements 76 are loosely fed into the guide tube 74 such that they are not placed in any substantial amount of compression, i.e. they are not forced into the guide tube 74, and consequently buckling of the fiber reinforcements 76 is avoided. As previously mentioned, the entrainment barrel 66 is heated to a temperature that maintains the polymer 80 flowable and assures substantially complete wetting of the fiber reinforcement 76. Polymer 80 under pressure $P_1$ is introduced into the polymer inlet 69a, filling the annular passageway 69, and establishing a flow of the polymer 80 through the convergence region 86 into the upstream end 68a of the capillary tube 68. The polymer pressure differential $P_1$-$P_a$ established between the polymer inlet 69a and the material deposition end 72 maintains the flow of polymer 80 to the capillary tube 68. In other words, the polymer 80 seeks to equilibrate by flowing from the polymer inlet 69a at a relatively high pressure $P_1$ to the material deposition end 72 at relatively lower pressure $P_a$.

The flow of the polymer 80 through the convergence region 86 produced by the pressure differential $P_1$-$P_a$, causes the polymer 80 to "grab" and draw the fiber reinforcement 76 along with the flowing polymer 80 into the upstream end 68a of the capillary tube 68 where it becomes entrained in the polymer 80. Additionally, the fiber reinforcement 76 is drawn through the capillary tube 68 by capillary action produced by intermolecular forces between the polymer 80 and the surrounding capillary tube 68. As the fiber reinforcement is drawn into the capillary tube 68, fiber reinforcement 76 becomes entrained within the flowing polymer 80 and is extruded and then deposited along with the polymer 80 in a molten bead 44 (FIG. 1) to form successive layers 22 of the part 26 as the end effector 20 is rastered over the substrate 23.

When a layer 22 or other feature of the part 26 has been formed, the cutter 46 severs the bead 44, and the polymer supply 50 may be shut off until the end effector 20 is ready to deposit the next layer 22. Severing of the bead 44 results in severing of both the polymer 80 and the fiber reinforcement 76 entrained in the polymer 80. In some applications, it may be possible to temporarily interrupt feeding of the fiber reinforcement 76 in order to deposit beads 44 that are purely polymer 80 (devoid of fiber reinforcements) in order to form layers 22 that do not contain a reinforcement.

Attention is now directed to FIG. 5 which broadly illustrates a deposition fabrication method employing an end effector 20 of the type described above. Beginning at 54, a pressurized stream of a polymer 80 is established through a tube 68 which may be a capillary tube. The pressurized stream of the polymer 80 may be established by establishing a pressure differential between the polymer inlet 69a (FIG. 2) and the downstream end 68b of the capillary tube 68. At 56, a fiber reinforcement 76 is entrained within the pressurized polymer stream. In some embodiments, the method may optionally include heating the fiber reinforcement 76 before it is entrained in the pressurized stream of the polymer 80. At 58, a bead 44 of the polymer 80 having the fiber reinforcement 76 entrained therein is deposited from the tube onto a substrate 23. The pressurized stream of the polymer 80 may be established by supplying the polymer 80 to the upstream end 68a of the capillary tube 68 at a pressure $P_1$ that is higher than the pressure $P_a$ at which the polymer exists the downstream end 68b of the capillary tube 68 and is deposited from the material deposition end 72.

FIG. 6 broadly illustrates a method of fabricating a composite part 26 by the additive manufacturing technique previously described. At 60, a deposition head 40 is rastered over a substrate 23. At 62, features of the composite part 26 are additively formed by extruding a polymer 80 having an entrained continuous fiber reinforcement 76 from the deposition head 40 onto the substrate 23. Extrusion of the polymer along with the entrained continuous fiber reinforcement 76 may be achieved by flowing a pressurized stream of the polymer 80 through a capillary tube 68 generated by a pressure differential $P_1$-$P_a$, between an upstream end 68a and a downstream end 68b of the capillary tube 68.

In some applications, in order to increase fabrication speed, it may be necessary or desirable to employ an end effector 20 having more than a single deposition head 40. Referring to FIG. 7, a plurality of the deposition heads 40 may be ganged together in an array 88 on a single end effector 20 (FIG. 1). Each of the deposition heads 40 may include an extrusion nozzle from which a bead (not shown) of fiber reinforced polymer may be deposited onto a substrate 23 (FIG. 1) to additively form features of the part.

Figure 8:
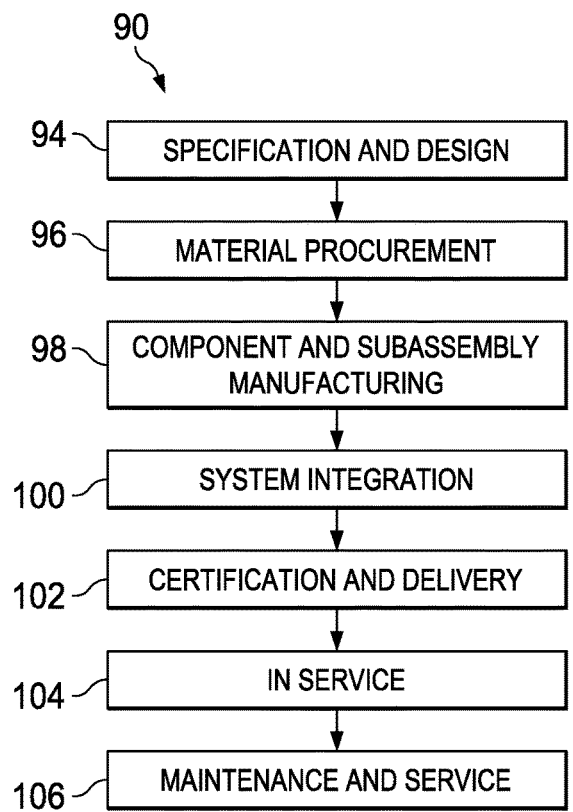
FIG. 8 is an illustration of a flow diagram of aircraft production and service methodology.
Figure 9:
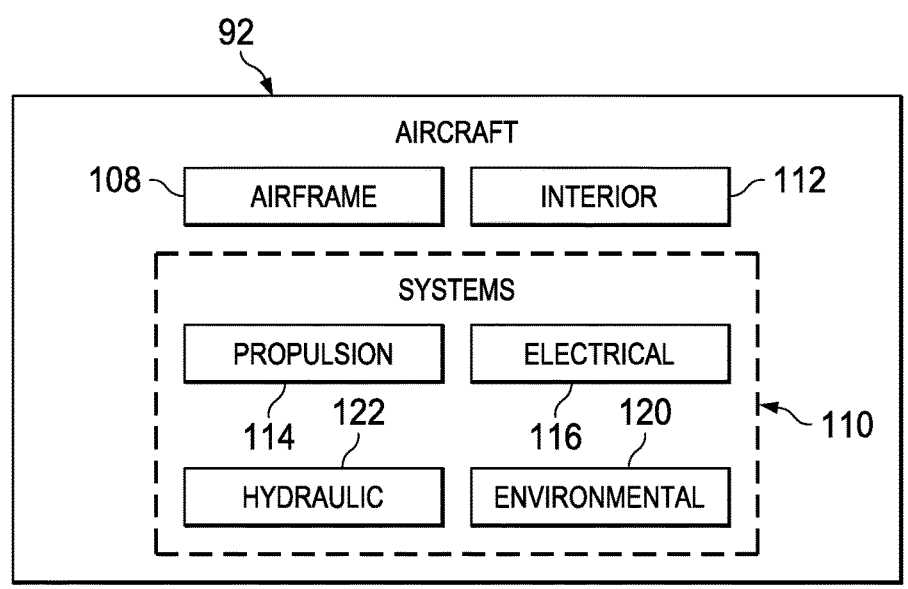
FIG. 9 is an illustration of a block diagram of an aircraft.

Embodiments of the disclosure may find use in a variety of potential applications, particularly in the transportation industry, including for example, aerospace, marine, automotive applications and other application where fiber reinforced polymer parts may be used. Thus, referring now to FIGS. 8 and 9, embodiments of the disclosure may be used in the context of an aircraft manufacturing and service method 90 as shown in FIG. 8 and an aircraft 92 as shown in FIG. 9. Aircraft applications of the disclosed embodiments may include, for example, without limitation, prototype components, low production run parts and reinforced structures that may be difficult or costly to manufacture using conventional processes. During pre-production, exemplary method 90 may include specification and design 94 of the aircraft 92 and material procurement 96. During production, component and subassembly manufacturing 98 and system integration 100 of the aircraft 92 takes place. During component and subassembly manufacturing 98, the disclosed method and apparatus may be employed to produce components or subassemblies that are then integration as part of the system integration 100. Moreover, the embodiments may be used to produce components that enable other components to be assembled together and/or integrated. Thereafter, the aircraft 92 may go through certification and delivery 102 in order to be placed in service 104. While in service 104 by a customer, the aircraft 92 is scheduled for routine maintenance and service 106, which may also include modification, reconfiguration, refurbishment, and so on. The disclosed embodiments may be used to fabricate parts or components that are used to repair or replace components as part of the maintenance and service 106.

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 92 produced by exemplary method 90 may include an airframe 108 with a plurality of systems 110 and an interior 112. Examples of high-level systems 110 include one or more of a propulsion system 114, an electrical system 116, a hydraulic system 122 and an environmental system 120. Any number of other systems may be included. Although an aerospace example is shown, the principles of the disclosure may be applied to other industries, such as the marine and automotive industries. The disclosed embodiments may be employed to fabricate custom-designed, prototype or low production run fiber reinforced polymer components or parts used in the airframe 108, any of the systems 110 or the interior 112.

Systems and methods embodied herein may be employed during any one or more of the stages of the production and service method 90. For example, components or subassemblies corresponding to production process 98 may be fabricated or manufactured in a manner similar to components or subassemblies produced while the aircraft 120 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A deposition fabrication method, comprising:
    establishing a pressurized stream of a first polymer through a tube, wherein the first polymer has a first melt temperature;
    entraining a carbon nanotube reinforcement within the pressurized stream, wherein the carbon nanotube reinforcement is pre-impregnated with a second polymer that has a second melt temperature, wherein the second melt temperature is less than the first melt temperature, and wherein entraining is performed above the first melt temperature but below the second melt temperature, and wherein entraining further comprises:
        feeding the carbon nanotube reinforcement into the tube, the tube being disposed inside an annular inlet of an entrainment barrel surrounding the tube, wherein the tube ends at an entrance to a capillary tube disposed inside the entrainment barrel;
        flowing the liquified polymer into the annular inlet and around the tube, including flowing the liquified polymer past the tube and into the capillary tube via a convergence region in which the liquified polymer is allowed to flow onto the carbon nanotube reinforcement just as the carbon nanotube reinforcement enters the capillary tube; and
    depositing a bead of the polymer and the carbon nanotube reinforcement from the tube onto a substrate.

2. The deposition fabrication method of claim 1, wherein entraining the carbon nanotube reinforcement includes feeding at least one of a tow, a roving and a yarn into the tube.

3. The deposition fabrication method of claim 1, wherein entraining the carbon nanotube reinforcement includes feeding one of a dry fiber reinforcement and a pre-impregnated fiber reinforcement into the tube.

4. The deposition fabrication method of claim 1, wherein entraining the carbon nanotube reinforcement includes feeding one of a continuous fiber reinforcement and a discontinuous fiber reinforcement into the tube.

5. The deposition fabrication method of claim 1, further comprising:
    heating the carbon nanotube reinforcement.

6. The deposition fabrication method of claim 1, further comprising:
    coupling together a plurality of discontinuous fiber reinforcements into a chain, and wherein entraining carbon nanotube reinforcement includes drawing the chain into the pressurized stream.

7. The deposition fabrication method of claim 1, further comprising:
    encapsulating the carbon nanotube reinforcement in a polymer having a melt temperature that is higher than the melt temperature of the polymer in the pressurized stream thereof.

8. The deposition fabrication method of claim 1, further comprising:
    maintaining a desired viscosity of the polymer by applying a varying amount of heat to the tube along a length of the tube.

9. The deposition fabrication method of claim 1, further comprising:
    depositing a bead of polymer onto the substrate, wherein the polymer is devoid of the carbon nanotube reinforcement.

10. The deposition fabrication method of claim 1, wherein establishing the pressurized stream includes injecting the polymer under pressure into the tube.

11. The deposition fabrication method of claim 10, wherein injecting the polymer under pressure into the tube includes establishing a pressure differential between an upstream end and a downstream end of the tube.

12. The deposition fabrication method of claim 10, further comprising:
    drawing the carbon nanotube reinforcement through the tube using the pressurized stream.

13. The deposition fabrication method of claim 10, further comprising:
    drawing the carbon nanotube reinforcement through the tube using capillary action.

14. The deposition fabrication method of claim 10, wherein entraining the carbon nanotube reinforcement includes introducing the carbon nanotube reinforcement into an upstream end of the tube.

15. The method of claim 1 further comprising:
    maintaining a third temperature at a material supply end of an entrainment barrel that contains the tube at a higher temperature than a fourth temperature at a material deposition end of the entrainment barrel.

16. The method of claim 1, wherein the first polymer is different than the second polymer.

17. The method of claim 15, wherein the first polymer is different than the second polymer.

* * * * *